United States Patent [19]
Yoshihiro et al.

[11] Patent Number: 5,430,583
[45] Date of Patent: Jul. 4, 1995

[54] MAGNETIC RECORDING AND/OR REPRODUCING APPARATUS

[75] Inventors: Mitsugu Yoshihiro; Kazuyuki Sugizaki; Mikio Kita; Osamu Shimizu, all of Kanagawa, Japan

[73] Assignee: Sony Corporation, Tokyo, Japan

[21] Appl. No.: 52,752

[22] Filed: Apr. 27, 1993

[30] Foreign Application Priority Data

Apr. 30, 1992 [JP] Japan ................... 4-137944

[51] Int. Cl.$^6$ ................................ G11B 5/584
[52] U.S. Cl. ................... 360/77.15; 360/77.13
[58] Field of Search ................. 360/77.13, 77.15

[56] References Cited

U.S. PATENT DOCUMENTS

| | | | |
|---|---|---|---|
| 4,120,008 | 10/1978 | Metzger et al. | 360/77.13 X |
| 4,528,605 | 7/1985 | Hiraguri | 360/77.15 X |
| 4,651,239 | 3/1987 | Omori et al. | 360/77.15 X |
| 4,748,520 | 5/1988 | Odaka | 360/77.15 X |
| 4,802,032 | 1/1989 | Tatsuzawa et al. | 360/77.13 |

FOREIGN PATENT DOCUMENTS

| | | |
|---|---|---|
| 0223236 | 5/1987 | European Pat. Off. |
| 0380284 | 8/1990 | European Pat. Off. |
| 0458531 | 11/1991 | European Pat. Off. |
| 58-88822 | 5/1983 | Japan ............. 360/77.15 |

Primary Examiner—Aristotelis Psitos
Assistant Examiner—James T. Wilson
Attorney, Agent, or Firm—William S. Frommer; Alvin Sinderbrand

[57] ABSTRACT

A magnetic recording and reproducing apparatus, e.g., a video tape recorder for recording and reproducing digital video signals etc., is intended to reliably perform a tracking control even when recording tracks are formed with high density. A first pilot signal having a large azimuth loss and a second pilot signal without azimuth loss are recorded in a recording track, and a rough tracking control operation and a fine tracking control operation are executed on the basis of the second pilot signal and the first pilot signal respectively.

9 Claims, 8 Drawing Sheets

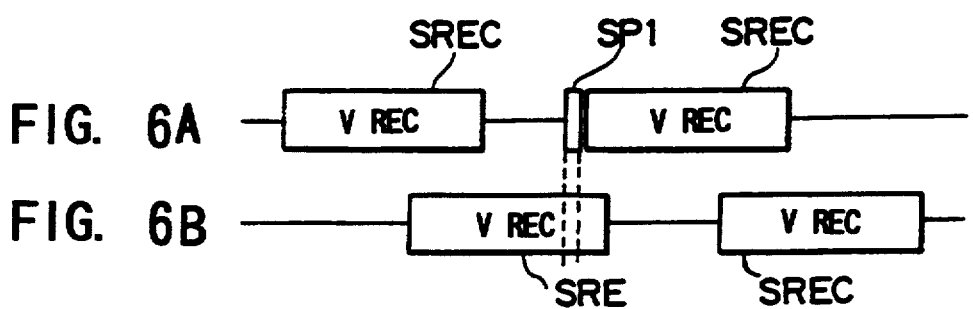
FIG. 6A
FIG. 6B
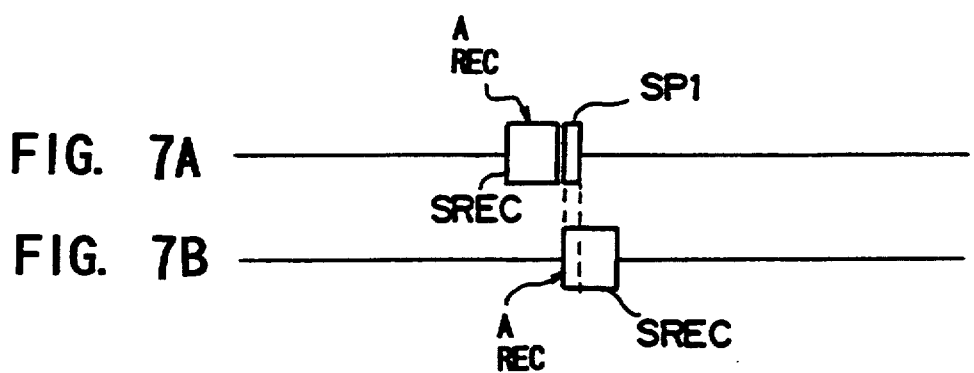
FIG. 7A
FIG. 7B

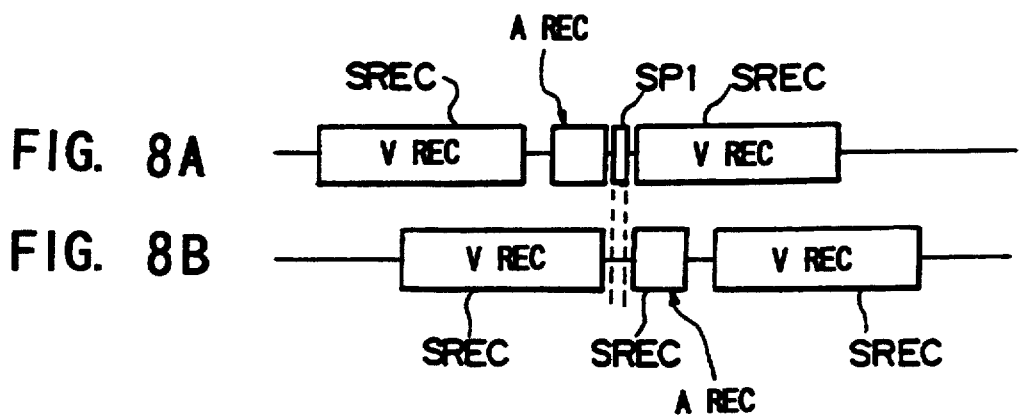
FIG. 8A
FIG. 8B
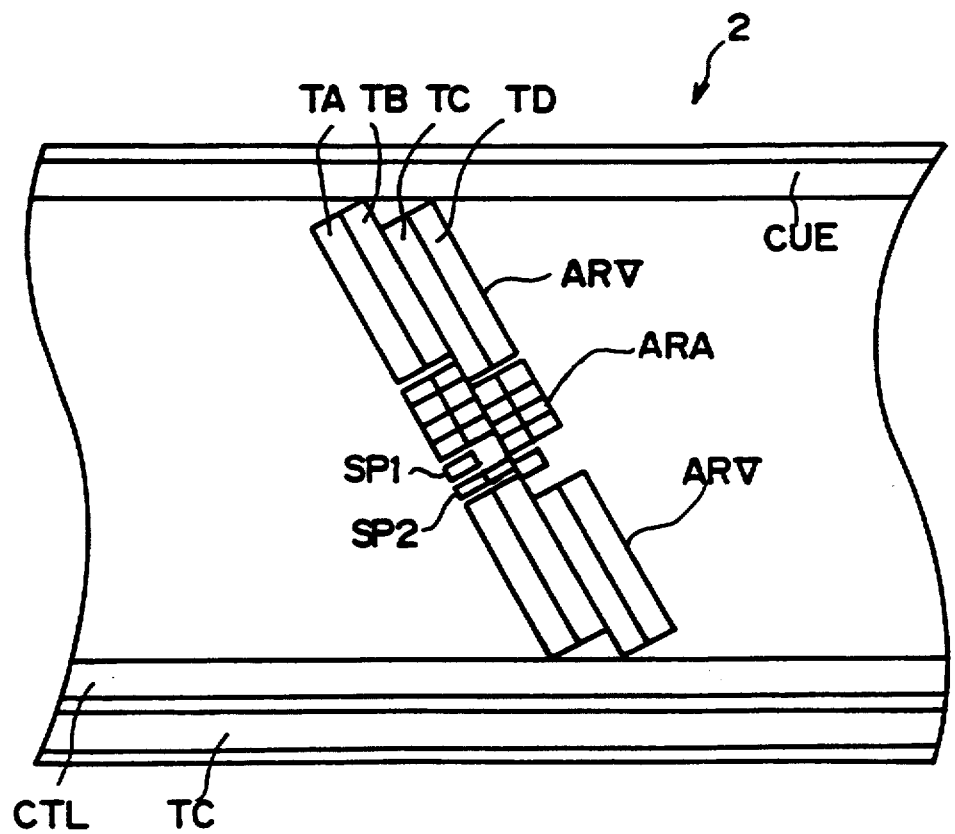
FIG. 9

MAGNETIC RECORDING AND/OR REPRODUCING APPARATUS

FIELD OF THE INVENTION

This invention relates to a magnetic recording and reproducing apparatus, and is applicable to, for example, a video tape recorder for recording and/or reproducing digital video signals.

BACKGROUND OF THE INVENTION

There is a known type of video tape recorder in which video signals are converted into a digital signal (hereinafter referred to as a digital video signal) for recording and/or reproducing.

In particular, use of error correction techniques and the like with a digital video signal can prevent deterioration of picture quality even in case of repeated processing, such as repeated dubbing.

Incidentally in a video tape recorder of this type, it can be expected that if recording tracks can be formed more densely, then the total recording density would be proportionally enhanced.

However, with the tracking control techniques used in conventional video tape recorders, it has been difficult to perform tracking control with a high degree of accuracy. Therefore, if the recording track is to be formed with high density, there would be a problem in that adequate tracking control would not be assured.

Specifically, in a conventional tracking control technique, a control signal (CTL) is recorded on a control track formed in the longitudinal direction of the magnetic tape, and tracking control is carried out using this control signal (hereinafter referred to as the CTL method).

According to this CTL method, when recording is performed by the video tape recorder, the control track is formed in the longitudinal direction of the magnetic tape and the control signal is recorded on the control track with a signal level that varies in synchronicity with the rotation of the rotary drum. On the other hand, when reproduction is performed by the video tape recorder, a phase comparison is performed with respect to the control signal and a reference signal synchronized with the rotation of the rotary drum, and the phase of a capstan motor is controlled on the basis of the result of the phase comparison.

However, in magnetic tape recording devices, the distance between a position at which the control signal is recorded and a recording track formed diagonally on the magnetic tape can be subject to variation due to a variations in the tape tension at the time of recording or reproducing, changes in the magnetic tape with the passage of time, changes in the magnetic tape transport system, and so forth.

Accordingly, it is difficult to perform tracking control with a high degree of accuracy with the CTL method. If the recording track is formed with high density, then proper tracking would sometimes become impossible.

Meanwhile, there is another conventional method for tracking control in which a predetermined pilot signal to be used for tracking control is recorded on the recording track along with the video signals.

According to this method, a burst signal that is at a low frequency and thus is subject to a relatively low azimuth loss is selected as the pilot signal, and is recorded on the recording track at the time of recording the video signal.

On the other hand, at the time of reproduction, with this type of tracking control, the level of the pilot signal which leaks from adjacent tracks before and after the track being scanned is detected, and the capstan motor is phase-controlled to minimize the signal level.

However, with this method, when the recording or reproducing efficiency of the magnetic head varies for example, the minimum pilot signal level and the optimum scanning position of the magnetic head could diverge from optimum values. Therefore, if the recording track is formed with high density, this method also might fail to assure proper tracking control.

A further problem with this method is that upon repeated editing of the tape with insertion of material, the divergence in position would tend to accumulate so as to eventually cause disruption in the reproduced picture before and after the point of insertion.

In contrast, there is also another method in which the level of the reproduction signal obtained from the recording track is detected, and tracking control is executed to maximize the signal level.

In this method, however, the level of the reproduction signal varies with picture patterns, etc. thereby making it difficult to perform tracking control with a high degree of accuracy.

Further, with such a method, if the deviation from the proper track is by one track or more the use of azimuth recording would cause almost no reproduction signal to be detected, making it difficult to perform tracking control.

Even when the amount of deviation is less than one track, there is a disadvantage in that a certain amount of time is required to achieve proper tracking.

SUMMARY OF THE INVENTION

In view of the foregoing, an object of this invention is to provide a magnetic recording and reproducing apparatus capable of reliably performing tracking control even when the recording track is formed with high density.

The foregoing object and other objects of the invention have been achieved by the provision of a magnet recording and reproducing apparatus 10 in which a plurality of magnetic heads A to D disposed on a rotary drum 12, form helical recording tracks TA, TB, TC, TD, . . . in order in the longitudinal direction of a magnetic tape 2 for azimuth recording a predetermined recording signal SREC, wherein a first pilot signal SP1 at a high frequency and subject to azimuth loss and a second pilot signal SP2 at a low frequency with less azimuth loss are recorded on the recording tracks TA, TB, TC, TD, . . . at the time of recording the recording signal SREC, and when the recording signal SREC is reproduced, tracking control is executed on the basis of reproduced signals SR corresponding to the first and second pilot signals SP1 and SP2.

Further, according to a second aspect of the present invention, the recording tracks TA, TB, TC, TD, . . . have first and second recording areas ARP1 and ARP2 in the longitudinal direction thereon, and the first pilot signal SP1 is recorded on the first recording area ARP1 and the second pilot signal SP2 is recorded on the second recording area ARP2.

Further, according to a third aspect of the present invention, the recording tracks TA, TB, TC, TD, . . . have a first recording area ARP1 substantially at the center in the longitudinal direction thereon and a second recording area ARP2 at a predetermined distance from the first recording area ARP1 in the direction of a scanning start end of the tracks, the first pilot signal SP1 is recorded on the first recording area ARP1, the second pilot signal SP2 is recorded on the second recording area, and a predetermined recording signal SREC is recorded at an area between the first and the second recording areas ARP1 and ARP2.

Further, according to a fourth aspect of the present invention, the recording tracks TA, TB, TC, TD, ... have first and second recording areas ARP1 and ARP2 in the longitudinal direction thereon, the first pilot signal SP1 is recorded on the first recording area ARP1, the second pilot signal SP2 is recorded on the first recording track TB, and in the second recording area of the TC, which follows track TB in the longitudinal direction of the magnetic tape 2, a guard signal at a high frequency and subject to azimuth loss is recorded or a signal-free area is formed.

Further, according to a fifth aspect of the present invention, the recording tracks TA, TB, TC, TD, ... have first and second recording areas ARP1 and ARP2 in the longitudinal direction thereon, the first pilot signal is recorded on the first recording area ARP1, and the second pilot signal SP2 is recorded in a phase-matched state with respect to both of two adjacent recording tracks TA and TB on the second recording areas ARP2 of those tracks.

Further, according to a sixth aspect of the present invention, the magnetic heads A to D are arranged such that the magnetic heads A and B (C and D), respectively having positive and negative azimuth angels together form a pair of heads which form respective recording tracks TA and TB (TC and TD), which have corresponding positive and negative azimuth angles. As a result, tracks of two different types are alternately formed in order in the longitudinal direction of the magnetic tape 2, and in the first recording area ARP1 of the tracks the first pilot signal SP1 is recorded on the recording track TA or TB (TC or TD), respectively having a positive or negative azimuth angle, while a signal-free area is formed on the adjacent recording track TB or TA (TD or TC), which has a negative or positive azimuth angle.

Further, according to a seventh aspect of the present invention, the recording tracks TA, TB, TC, TD, ... have a first recording area ARP1 in the longitudinal direction thereon and a second recording area ARP2 at a predetermined distance from the first recording area ARP1 in the direction of a scanning start end side of the tracks, the first pilot signal SP1 is recorded on the first recording area ARP1, the second pilot signal SP2 is recorded on the second recording area ARP2, and a predetermined recording signal SREC is recorded at an area between the first and the second recording areas ARP1 and ARP2, the magnetic heads A to D are arranged such that the magnetic heads A and B (C and D), which respectively have positive and negative azimuth angles, together form a pair of heads which form respective recording track TA or TB (TC or TD) respectively having a positive and a negative azimuth angles. As a result, tracks of two different types are formed alternately in order in the longitudinal direction of the magnetic tape 2, and the magnetic heads A and B (C and D) having respective positive and negative azimuth angles are located on the rotary drum 12 in such a manner that the magnetic head B or A (D or C) having a negative or positive azimuth angle scans the second recording area ARP2 at the same time as the magnetic head A or B (C or D) having a positive or negative azimuth angle scans the first recording area ARP1.

Further, according to the eighth aspect of the present invention, the tracking control is executed in such a manner that the timing at which the second pilot signal SP2 is reproduced is detected with respect to a predetermined reference signal PG, and the magnetic tape transport system 22 is controlled on the basis of the result of the detected timing so that the signal level of the reproduction signal SR corresponding to the first pilot signal SP1 is maximized.

By recording the first pilot signal SP1 at a high frequency that is subject to azimuth loss and the second pilot signal SP2 at a low frequency with less azimuth loss, and by performing the tracking control on the basis of the reproduction signal SR corresponding to the first and the second pilot signals SP1 and SP2, the accuracy of tracking can be enhanced by effective use of the advantages of the high frequency first pilot signal which is subject to azimuth loss and of the low frequency second pilot signal SP2 which has less azimuth loss.

Moreover, if first and second recording areas ARP1 and ARP2 are formed in the longitudinal direction on the recording tracks TA, TB, TC, TD, ..., the first pilot signal SP1 is recorded on the first recording area ARP1, and the second pilot signal SP2 is recorded on the second recording area ARP2, the first and the second pilot signals SP1 and SP2 can be easily separated at the time of reproduction.

Further, if a predetermined recording signals SREC is recorded at an area between the first and the second recording areas ARP1 and ARP2, the recording density can be enhanced by an effective use of the area between the first and the second recording areas ARP1 and ARP2.

With respect to the second recording area ARP2 of successive first and second recording tracks TB and TC, if the second pilot signal SP2 is recorded on the first recording track TB, and a guard signal at a high frequency that is subject to azimuth loss is recorded on the succeeding recording track TC, or a signal-free area is formed on the second recording track TC, it becomes possible to prevent undesirable effects to be generated such as cross-talk from the adjacent recording track TC.

On the other hand, reproduction signals without any waveform distortion can be obtained by recording the second pilot signal in a phase-matched state on adjacent tracks.

Meanwhile, with respect to the first recording area ARP1, if the first pilot signal SP1 is recorded on the recording track TA or TB (TC or TD), having respectively a positive or negative azimuth angle, and a signal-free area is formed on the subsequent recording track TB or TA (TD or TD), having respectively a negative or positive azimuth angle, the level of the reproduction signal can be varied in accordance with the amount of tracking deviation.

Further, for the magnetic heads A and B (C and D) having positive and negative azimuth angles, if the magnetic head B or A (D or C), respectively having a negative or positive azimuth angle, is disposed on the rotary drum to scan the second recording area ARP2 at the same timing as the magnetic head A or B (C or D), respectively having a positive or negative azimuth angle, scans the first recording area ARP1, it would become possible to prevent the leakage of a recording signal SREC even when the editing by insertion is executed.

Further, if the timing at which the second pilot signal SP2 is reproduced is detected on the basis of a predetermined reference signal PG, the magnetic tape transport system 22 is controlled on the basis of the result of the detected timing, the level of the reproduction signal SR corresponding to the first pilot signal SP1 is detected, and the magnetic tape transport system is controlled so as to maximize the level of the reproduction signal SR, it would become possible to perform rough tracking control using the second pilot signal SP2 and fine tracking control using the first pilot signal SP1.

The nature, principle and utility of the invention will become more apparent from the following detailed description when read in conjunction with the accompanying drawings in which like part are designated by like reference numerals or characters.

BRIEF DESCRIPTION OF THE INVENTION

In the accompanying drawings:

FIG. 6A and 6B are signal timing diagrams used to explain signal leakage when a distance between a first recording head and a second recording head is increased;

FIGS. 7A and 7B are signal timing diagrams used to explain signal leakage when a distance between the first and second recording heads is reduced;

FIGS. 8A and 8B are signal timing diagrams used to explain signal leakage in the video tape recorder of the embodiment of FIG. 5.

FIG. 9 is a schematic view used to explain a case in which first and the second pilot signal recording areas are formed close together;

DETAILED DESCRIPTION OF THE INVENTION

Preferred embodiments of this invention will be described with reference to the accompanying drawings;

(1) Recording Format

Figure 1:
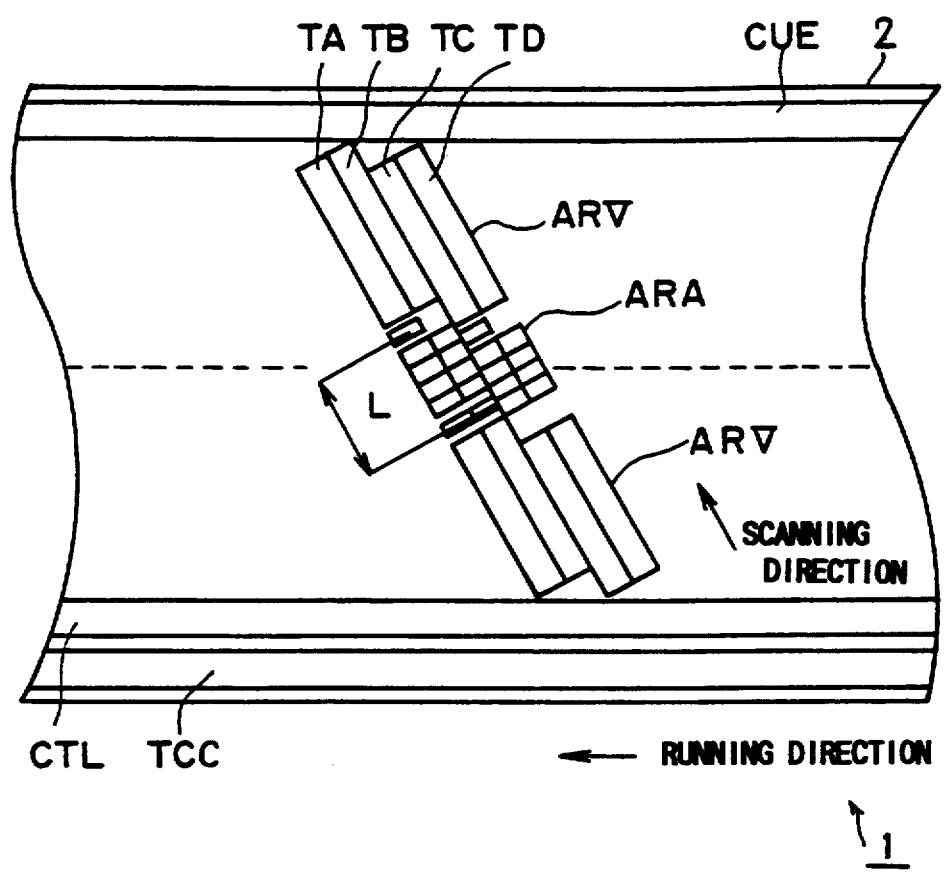
FIG. 1 is a schematic view showing a recording format of a video tape recorder according to an embodiment of the present invention.

In FIG. 1 reference numeral 1 generally designates a recording format provided in a video tape recorder incorporating the present invention, in which three recording tracks CUE, CTL and TCC are formed in the longitudinal direction of a magnetic tape 2.

An audio signal for one channel is recorded in the form of analog signal in the recording track CUE formed at the upper side of the magnetic tape 2 so as to enable the reproduction of the audio signal even when the magnetic tape is advanced in a fast forward mode.

Meanwhile, the recording tracks CTL, TCC formed at the lower side are respectively formed to record a control signal and a time record signal. The time record signal is reproduced for editing or the like and can be interpolated with the control signal as required in case of high speed reproduction etc.

In addition, in this recording format 1, recording tracks TA, TB, TC, TD, . . . are formed helically in sequence at the central portion of the magnetic tape 2 for recording digital video signals thereon.

In this embodiment shown in the recording format 1, the recording tracks TA, TB, TC, TD, . . . are formed close to each other at one-quarter of the conventional track pitch, i.e., at 0.012 [mm], so that the recording tracks TA, TB, TC, TD, . . . are formed with high density, thereby enabling efficient recording of the digital video signals.

In the recording tracks TA, TB, TC, TD, . . . , the digital video signals are recorded by recording heads having positive and negative azimuth angles respectively so as to perform azimuth recording with the successive recording tracks TA and TB, TC and TD, . . . respectively forming pairs.

Further, in these paired recording tracks TA and TB, TC and TD, . . . , the scanning start end and the scanning finish end are formed to substantially correspond in the longitudinal direction of the recording tracks TA, TB, TC, TC, . . . .

A recording area ARA for the audio signal is formed at the central position of the recording tracks TA, TB, TC, TD, . . . , and an audio signal for four channels is PCM-recorded on this audio signal recording area ARA.

Further, at both ends of the audio signal recording area ARA, a video signal recording area ARV is formed with a predetermined recording area between the audio signal rewinding area ARA and the video signal recording area ARV, and the digital video signal is recorded in this video signal recording area ARV.

For the video signal recording area ARV, six recording tracks are used to record the video signals for one frame, and furthermore the digital video signal and the audio signal are recorded in accordance with a Class 4 Partial Response method.

Figure 2:
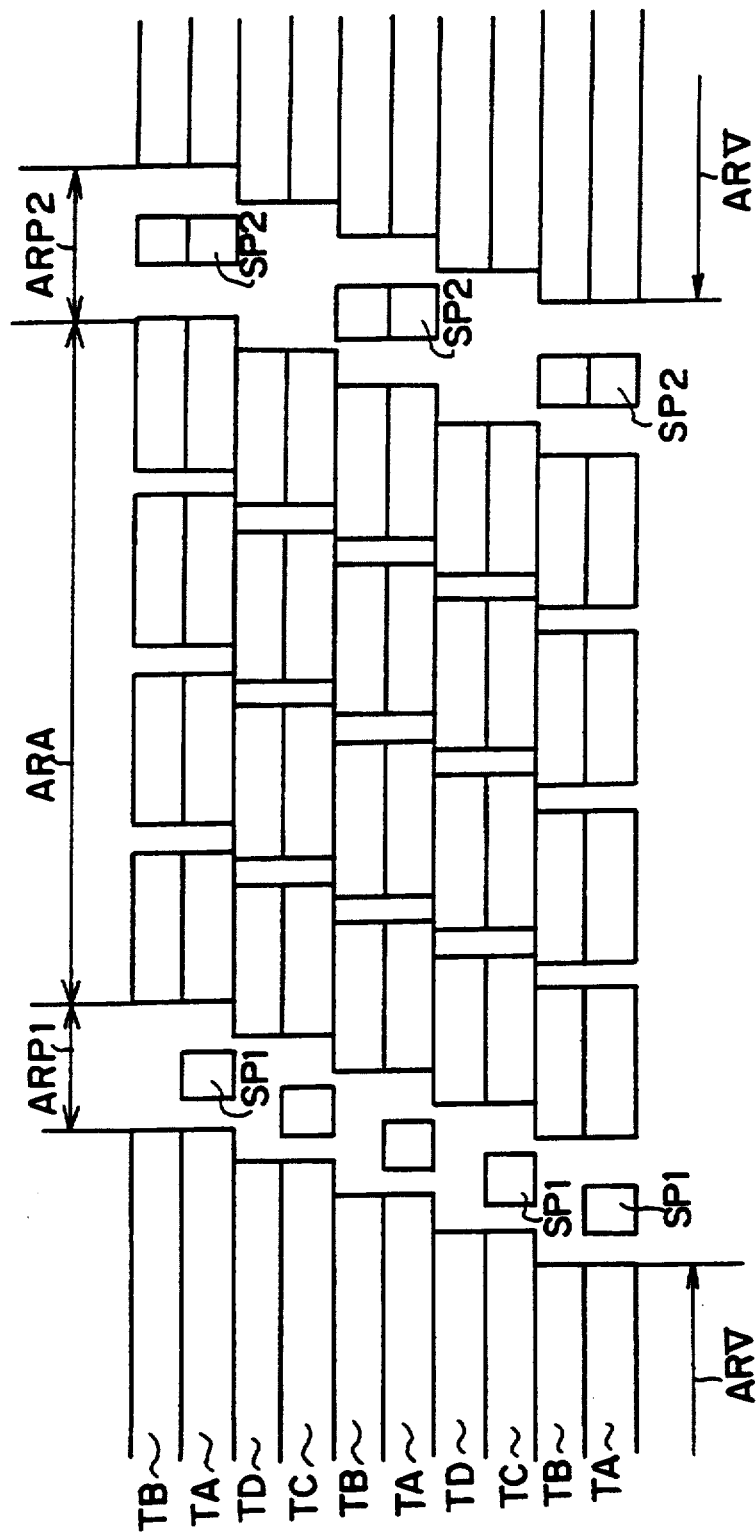
FIG. 2 is a schematic view showing the format of FIG. 1 in more detail.

As shown in FIG. 2 first and second recording areas ARP1 and ARP 2 are formed between the audio signal recording area ARA and the video signal recording area ARV, and a pilot signal for tracking control is recorded in these first and second recording areas ARP1 and ARP2.

In the second recording area ARP2, which is toward the scanning start end side, the second pilot signal SP2 is recorded at intervals of two recording track periods with respect to the paired recording tracks TA and TB, TC and TD with a predetermined spacing in the forward or rearward direction. In this format, a burst signal at a frequency of 417 [kHz], which is scarcely subject to azimuth loss, is selected as the second pilot signal SP2.

In this embodiment, the second pilot signal SP2 is recorded on both recording tracks TA and TB with the same phase in the longitudinal direction of the recording tracks. As a result, even when the magnetic head scans in overlapping fashion on the recording tracks TA and TB, the pilot signal can be reproduced without no waveform distortion.

Further, a burst signal at a frequency of 16 [MHz], which is subject to azimuth loss, (hereinafter referred to as guard signal) is recorded in an area in which the second pilot signal SP2 is not recorded, and as a result the second pilot signal SP2 is recorded so that it is separated from the audio signal recording area, the video signal recording area and the contiguous tracks.

Therefore, in the second recording area ARP2, even when the magnetic head deviates toward the contiguous area with respect to the area in which the second pilot signal SP2 is recorded, the second pilot signal SP2 can be reliably detected.

In this manner, since the second pilot signal SP2, which is subject to almost no azimuth loss, is recorded at a two-recording track period, it is possible to reproduce the second pilot signal even when the two magnetic heads deviate forwardly or rearwardly in a range of two tracks with respect to the paired recording tracks TA and TB, TC and TD, and the second pilot signal SP2 can be reliably detected even when the scanning position of the magnetic head changes.

For example, if the deviation is in a range of more than two tracks, according to this embodiment, the second pilot signal can be reproduced from a recording track at a distance of four tracks therefrom. Thus, the second pilot signal can be detected irrespective of the scanning position on the magnetic tape.

Moreover, even if the magnetic head deviates so that it scans an adjacent recording track on which a guard signal is recorded, the second pilot signal can still be detected. As a result, undesirable signal leakage from the adjacent recording track can be prevented so it is possible to reliably detect only the second pilot signal SP2 from the target track. In this embodiment, a rough tracking operation is carried out on the basis of the reproduced second pilot signal SP2.

In practice, in this type of video tape recorder, the signal leakage from the adjacent tracks has been prevented by performing azimuth recording. Therefore, when tracking control is executed using a high frequency pilot signal, if there is a deviation of one or more tracks, the pilot signal cannot be detected, thereby making it difficult to perform tracking control.

On the other hand, if tracking control is carried out using a low frequency pilot signal, the pilot signal can be detected even if the amount of deviation increases, since there is no azimuth loss. However, leakage from the adjacent recording tracks can arise so as to make it difficult to perform tracking control with a high degree of accuracy.

In particular, when the video signal and the audio signal are recorded using the Class 4 Partial Response as in this embodiment, a low frequency signal component is sometimes recorded as part of the video and audio signals, and the leakage of this signal component also can decrease the tracking accuracy.

However, if, as in this embodiment, a low frequency pilot signal is recorded at a period of two tracks and a guard signal is interposed between the adjacent recording tracks, the audio signal recording ARA and the video signal recording area ARV to separate the second pilot signal SP2 from the other signal areas, signal leakage from the adjacent recording tracks, the audio signal recording area ARA and the video signal recording area ARV can be prevented and the pilot signal can be reliably detected even when a deviation of one or more tracks takes place, so that simpler and more reliable tracking control is provided.

It is also possible to reduce the time required to achieve proper tracking.

Further, performing tracking control in combination with the pilot signal SP1 recorded on the first recording area ARP1 permits more accurate tracking control.

In addition, since a reproduction signal without any waveform distortion can be obtained by recording the pilot signal SP2 with the same phase in the recording tracks TA and TB, the pilot signal SP2 can be reliably detected, and correspondingly the accuracy of the tracking control can be enhanced.

According to a preferred embodiment of the invention, the first pilot signal SP1 is recorded separately from the next track having the first pilot signal recorded therein, by recording the first pilot signal SP1 in every other recording track, and at a predetermined distance rearward from the audio signal recording area ARA and forward of the video signal recording are ARV, and a signal-free area is formed between the first pilot signal SP1 and the recording areas ARA, ARV and the adjacent tracks.

With respect to the first pilot signal SP1, when the magnetic heads A to D deviate from proper scanning, the level of the reproduced pilot signal is reduced, and if the amount of deviation is one or more tracks, reproduction of the first pilot signal becomes impossible.

For this reason, in the present signal format rough tracking control is roughly carried out on the basis of the reproduced second pilot signal SP2 and fine tracking control is carried out on the basis of the reproduced first pilot signal, thereby permitting tracking control to be performed with a higher degree of accuracy.

Specifically, with respect to the second pilot signal SP2, while there is an advantage in that the reproduced second pilot signal can be detected even with a deviation of one or more tracks because of the low frequency of the second pilot signal the disadvantage of this signal is low tracking accuracy.

Meanwhile, the first pilot signal SP1 provides the advantage of high accuracy in tracking control due to the high frequency of the first pilot signal but the disadvantage of the first pilot signal is that tracking control becomes impossible with a deviation of one or more tracks.

Therefore, according to this embodiment, rough tracking control is performed on the basis of the second pilot signal SP2 and fine tracking control is performed on the basis of the first pilot signal SP1 to mutually compensate for the disadvantages of the two types of signal. As a result, even when there is a tracking deviation of one or more tracks, tracking control can be executed with a high degree of accuracy.

Further, in a video tape recorder, since the first and the second recording areas ARP1 and ARP2 are disposed before and behind the audio signal recording area at the center of the track, the tracking control can be performed with high accuracy on the basis of a substantially central position of the respective recording track.

In practice, when the pilot signals SP1 and SP2 are recorded at the scanning start end of the track, the amount of tracking deviation tends to be increased at the other end of the recording track due to expansion and contraction of the magnetic tape 2 in the longitudinal direction and inter-machine variations in the scanning angle, and the C/N ration of the reproduced signal is correspondingly and significantly decreased.

However, as provided in this embodiment, if the pilot signals SP1 and SP2 are recorded substantially at the central position of the track in the scanning direction, the amount of tracking deviation can be distributed between the scanning start end and the scanning finish end of the track, thereby preventing significant deterioration in the C/N ratio of the reproduced signal.

(2) Principles of Tracking Control

Figure 3:
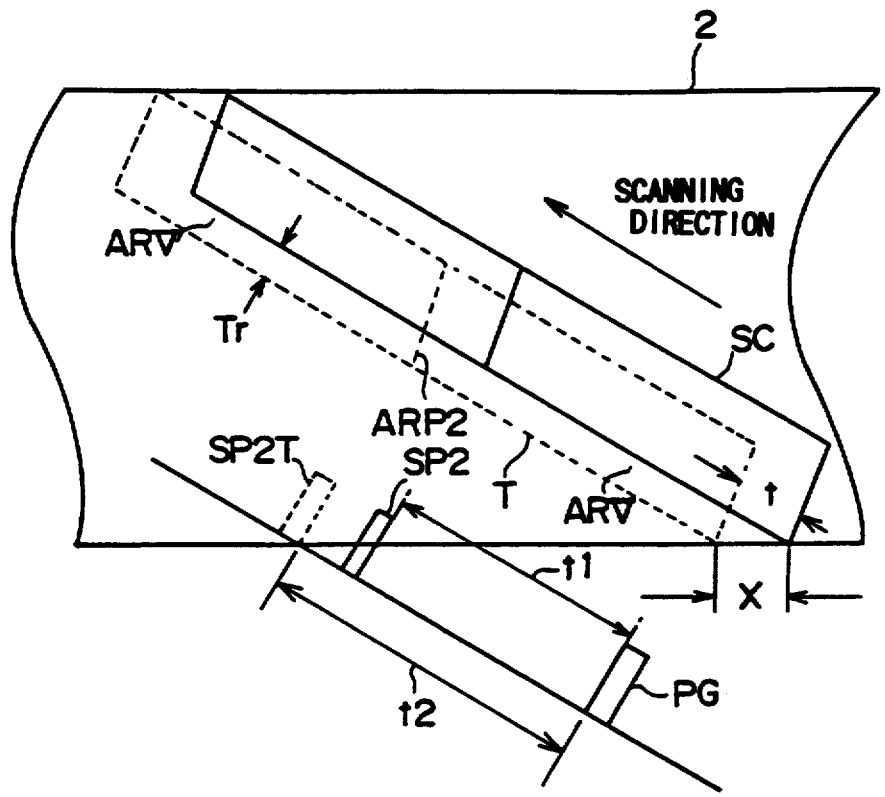
FIG. 3 is a schematic view used to explain a tracking servo using a second pilot signal.

FIG. 3 shows the principles of tracking control according to the present invention, in which tracking control is executed to bring the scanning course SC into accord with the recording track T.

In a video tape recorder according to this invention, it is assumed that there is a tracking deviation by a distance Tr in the direction perpendicular to the recording track T. Therefore, it is understood that proper tracking is to be obtained by moving the position of the recording track by a distance X in the longitudinal direction of the magnetic tape 2 by controlling the magnetic tape transport system.

Specifically, tracking control can desirably be performed by controlling the magnetic tape transport system to make the distance X zero. In this embodiment, the amount of tracking error is roughly detected by performing a time measurement (i.e., in this case the time t is detected) corresponding to the distance X and on the basis of the second recording area ARP2.

Therefore, in this example, the time interval t1 passes from the drum phase signal PG which is generated in synchronicity with the rotation of the rotary drum, until the time of reproduction of the second pilot signal SP2.

However, when the magnetic head is not accurately scanning the reproducing track T, the second pilot signal SP2 is reproduced after a period t2 has passed with respect to the drum PG signal PG. Therefore, it is understood that the time difference between t1 of t2 is proportional to the amount of deviation Tr.

However, the period of the low frequency pilot signal SP2 is too long to permit accurate detection of the amount of tracking deviation by the time measurement.

Therefore, the second pilot signal is used for rough tracking control to provide the advantage that the amount of deviation can be detected even when there is an offset of one or more tracks while the first pilot signal SP1 is used for fine adjustment of the tracking.

Figure 4:
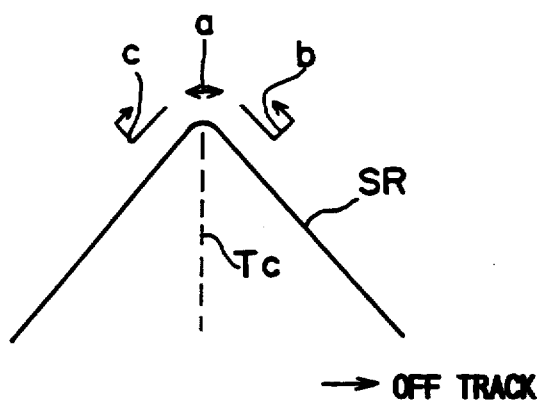
FIG. 4 is a schematic view used to explain a tracking servo using a first pilot signal.

Specifically, as shown in FIG. 4 for a first pilot signal SP1, a signal with a large azimuth loss is recorded in burst form. Therefore, if there is any deviation from the track center, the level of the reproduced first pilot signal would be sharply lowered.

Therefore, by controlling the magnetic tape transport system to deviate within a narrow range as shown by arrow a, and by determining that a deviation has taken place when the signal level abruptly falls as shown by arrows b and c, it becomes possible to execute tracking control with a high degree of accuracy.

A conventional video tape recorder (a video tape recorder with an 8 [mm] wide magnetic tape) includes a method for performing the tracking control by detecting the signal level of the pilot signal, as in the present embodiment.

However, this conventional tracking control technique performs tracking control by detecting leakage from adjacent tracks, and therefore, fails to achieve high-accuracy tracking control such as is performed in the present embodiment.

Thus, by recording the second pilot signal which has no azimuth loss and the first pilot signal which has a large azimuth loss, roughly correcting the tracking deviation by means of the second pilot signal, and finely correcting the tracking deviation by means of the first pilot signal, it is possible to reliably perform tracking control even when the recording track is formed with high density.

(3) Composition of the Video Tape Recorder

Figure 5:
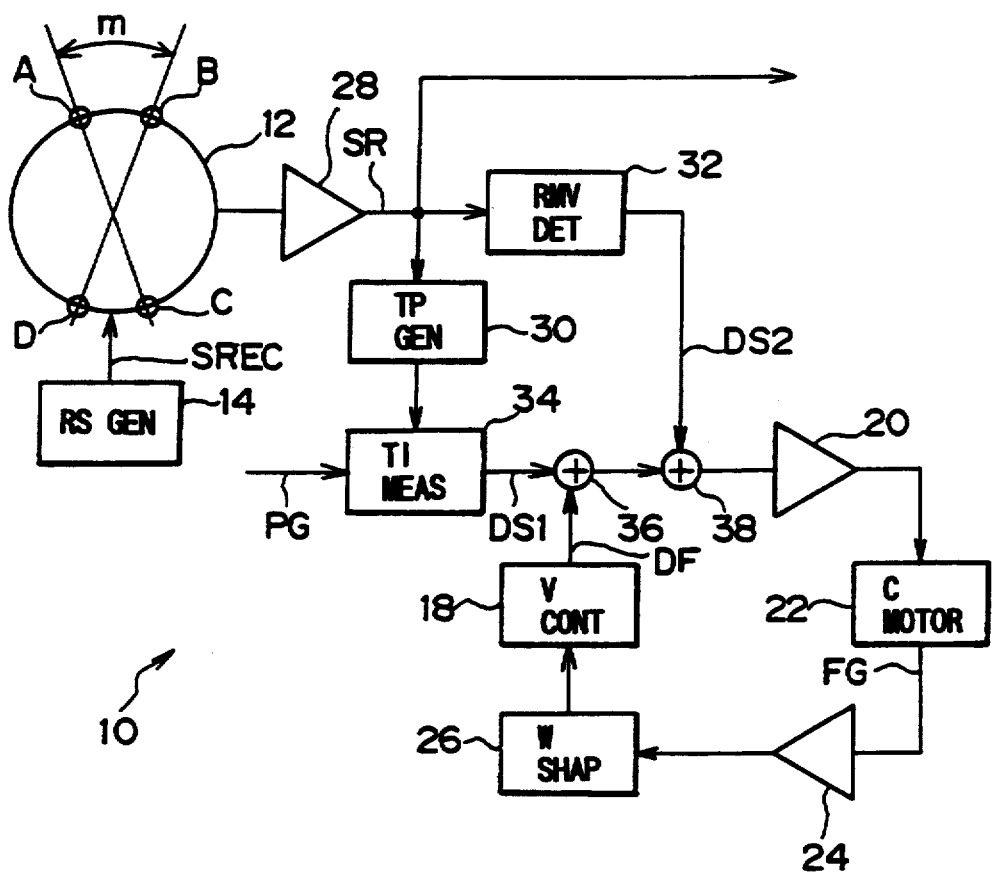
FIG. 5 is a block diagram showing a video tape recorder incorporating the tracking servos of FIGS. 3 and 4.

In the video tape recorder 10, as shown in FIG. 5, a plurality of magnetic heads A to D are mounted on the rotary drum 12 and used selectively for recording the video signal and the audio signal in accordance with the aforementioned format.

In particular, the magnetic heads A and B respectively having positive and negative azimuth angles are mounted on the rotary drum 12 with a predetermined angle distance m therebetween, and further the magnetic heads C and D respectively having positive and negative azimuth angles are mounted thereon at a spacing angle of 180 degrees relative to the magnetic heads A and B.

In the video tape recorder 10, the recording signal SREC generated by the recording signal generating circuit 14 is output by the magnetic heads A to D for sequentially forming the recording tracks in the aforementioned format.

Also, in the video tape recorder 10, the magnetic tape is wound around the rotary drum 12 with a winding angle of 180 degrees such that each pair of magnetic heads A and B, C and D form the corresponding pair of recording tracks TA and TB, TC and TD, respectively, at substantially the same time.

Further, in the recording signal generating circuit 14, the divergence of the scanning timing between the preceding pair of magnetic heads A and C and the latter pair of magnetic heads B and D is corrected by changing the timing of the recording signals SREC to be output to the magnetic heads A to D, thereby sequentially forming the recording tracks in a predetermined format.

In addition, at the time of editing by insertion, the recording signal generating circuit 14 outputs necessary recording signal SREC only for a period during which the magnetic heads A to D scan predetermined areas of the video signal recording area ARV or the audio signal recording area ARA in accordance with the editing mode.

Consequently, in the video tape recorder 10, at the time of editing by insertion as well as in the reproducing mode, it is possible to perform tracking control globally on the basis of the reproduction signal SR obtained from the first and the second recording areas ARP1 and ARP2.

Specifically, in the video tape recorder 10, the capstan motor 22 is driven by a motor driving circuit 20 on the basis of velocity control data DF output from the velocity control circuit 18. At this time, a rotating velocity detection signal FG which varies in accordance with the rotating velocity of the capstan motor 22 is amplified by the amplifying circuit 24 and thereafter is wave-shaped by a wave-shaping circuit 26 for output to the velocity control circuit 18.

The velocity control circuit 18 rotatively drives the capstan motor 22 on the basis of the rotating velocity detection signal FG at a predetermined rotating velocity.

Further, the video tape recorder 10, after amplifying the reproduction signal SR output from the magnetic heads A to D by means of the reproduction amplifying circuit 28, output the amplified signal to a timing pulse generating circuit 30 and an RF maximum value detecting circuit 32.

The timing pulse generating circuit 30 extracts the signal component corresponding to the second pilot signal by means of a band-pass-filter circuit and performs envelope-detection on the extracted second pilot signal to detect the level of the second pilot signal SP2.

Then, the timing pulse generating circuit 30 supplies the envelope-detected output to a comparing circuit which provides a compared result with respect to a predetermined reference level, thereby detecting a rising transition of the second pilot signal SP2.

After initiating a counter operation simultaneously with the drum phase signal PG, the time interval measuring circuit 34 stops the counting operation simultaneously with the rising transition of the second pilot signal on the basis of the detected result provided by the timing pulse generating circuit 30, in order to measure the time interval between the drum phase signal PG and pilot signal SP2.

Further, the time interval measuring circuit 34 provides a comparison signal based on the result of the counting operation and a predetermined reference value, and outputs phase control data DS1 in accordance with the comparison signal.

Thus, in the video tape recorder 10, the capstan motor 22 is driven by adding phase controlling data DS1 to the velocity control data DF in the adding circuit 36 so as to roughly control the tracking on the basis of the second pilot signal SP2.

On the other hand, the RF maximum value detecting circuit 32 extracts the signal component corresponding to the first pilot signal SP1 by means of a band pass filter circuit and performs enveloped detection on the extracted first pilot signal, thereby detecting the level of the first pilot signal SP1.

Further, the RF maximum value detecting circuit 32 provides a comparison signal based on the envelope-detected output and an envelope detected output for a preceding period that is stored in a memory means, in order to detect an increase or decrease of the level of the first pilot signal SP1, and phase control data DS2 is output from the RF maximum value detecting circuit 32 on the basis of the detected result.

In this manner, in the video tape recorder 10, the adding circuit 38 adds the phase control data DS2 to the added signal from the adding circuit 36, and the resulting added signal acts to drive the capstan motor 22 so as to enable fine tracking control based on the first pilot signal SP1.

During editing by insertion, when the level of the first pilot signal SP1 is detected, if the recording signal SREC is supplied to the magnetic head B, the recording signal invades the reproduction signal by crosstalk, disturbing accurate detection of the level of the first pilot signal SP1.

To cope with this problem, according to this embodiment, the angle distance m between the magnetic heads A and B, and C and D is set to 20 degrees, and the distance L (FIG. 1) between the first recording area ARP1 and the second recording area ARP2 is set to a predetermined value, such that at the same time as the preceding magnetic heads A and C scan the audio signal recording area ARA and thereafter scan the recording area ARP1 for the first pilot signal SP1, the trailing magnetic head B and D scan the recording area APR2 for the second pilot signal SP2.

In practice, as shown in FIGS. 6A and 6B, if the angle distance m is set to a large value relative to a distance L between the first and second recording areas ARP1 and ARP2, the video recording signal is supplied to the magnetic head B (D) (FIG. 6B) while the first pilot signal SP1 is reproduced by the magnetic head A (C) (FIG. 6A), and in this case the recording signal SREC for the video signal will invade the reproduction signal corresponding to the first pilot signal SP1.

On the other hand, as shown in FIGS. 7A and 7B, if the angle distance m is set to a small value relative to the distance L between the first and the second recording areas ARP1 and ARP2, the recording signal SREC corresponding to the audio signal comes to be supplied to the magnetic head B (D) (FIG. 7B) while the first pilot signal SP1 is reproduced by the magnetic head A (C) (FIG. 7A), in which case the recording signal SREC corresponding to the audio signal will invade the reproduction signal corresponding to the first pilot signal.

In contrast, as shown in FIG. 8A and 8B, according to this embodiment, the magnetic head B (D) scans the second recording area ARP2 (FIG. 8B) while the first pilot signal SP1 is reproduced by the magnetic head A (C) (FIG. 8A) so as to prevent the invasion of the recording signal SREC.

Meanwhile, another method wherein the first and second recording areas ARP1 and ARP2 are formed close together can be considered as shown in FIG. 9. However, in this method, to prevent cross talk between the paired magnetic heads A and B (C and D) as in this embodiment, it is necessary to mount the magnetic heads A and B (C and D) very close together, and practically it is impossible to mount the magnetic heads in this manner on the rotary drum 12.

Figure 10:
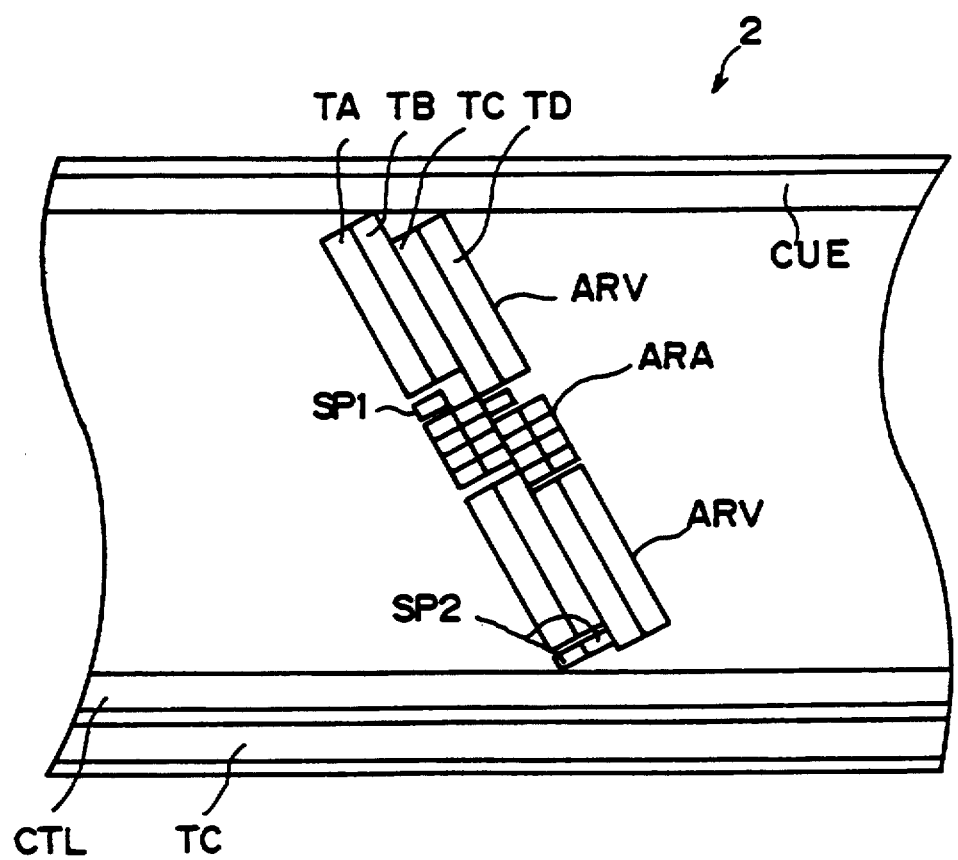
FIG. 10 is a schematic view used to explain a case in which the first and the second recording areas are formed remote from each other.

Further, as shown in FIG. 10, when the first and second recording areas ARP1 and ARP2 are disposed with one video signal recording area ARV as well as audio signal recording area ARA therebetween, the paired magnetic heads A and B (C and D) must be disposed with a spacing angle of 90 degrees. This means that a preceding recording head, etc., cannot be mounted on the rotary drum 12.

Therefore, according to this embodiment, the format is set so that the spacing angle between the magnetic head A and B (C and D) can be set to an appropriate value m, and so that, when the first and second recording areas ARP1 and ARP2 are disposed with the audio signal recording area ARA therebetween, the preceding magnetic head A (C) reproduces the pilot signal SP1 for tracking control, while the trailing magnetic heads B (D) scans the second recording area ARP2. As a result, the tracking accuracy can be simply and reliably improved.

Further, by recording the second pilot signal SP2 while interposing the guard signal and recording the first pilot signal SP1 by forming a signal-free area therearound, even when the timing for forming the recording track changes slightly during editing by insertion, accumulated in changes the timing can be prevented from undesirable affecting the tracking control. Therefore, correspondingly, the digital video signal can be reproduced even if there is repeated editing by insertion.

Figure 11:
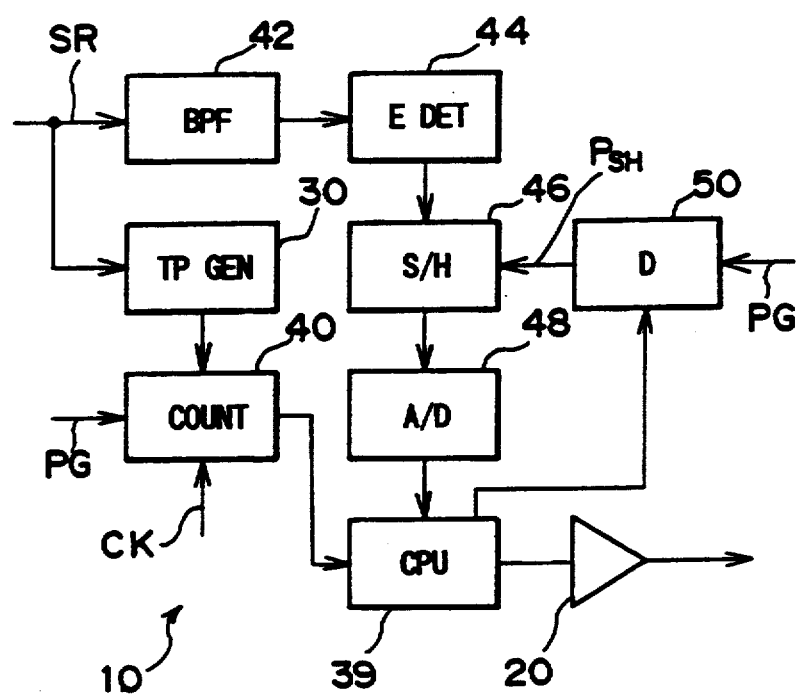
FIG. 11 is a block diagram showing an arrangement of a practical tracking servo circuit.

As shown in FIG. 11, in practice, in the video tape recorder 10 tracking control is carried out on the basis of calculations performed by the central processing unit (CPU) 39.

Specifically, in the video tape recorder 10, predetermined clock signals CK are counted in the counter circuit 40 on the basis of the output signal from the timing pulse generating circuit 30 and the drum phase signal PG, thereby performing the time measurement for the second pilot signal SP2.

Then, the counted result provided from the counter 40 is used for calculations in the CPU 39 to generate the first phase control data DS1 so that the time interval measuring circuit 34 is formed by the CPU 39 and the counter 40.

Further, after the band pass filter circuit (BPF) 42 extracts the first pilot signal SP1 from the reproduction signal SR, the envelope detecting circuit 44 detects the envelope of the reproduced first pilot signal.

In addition, a sample hold circuit (S/H) 46 samples and holds the output signal from the envelope detecting circuit 44, and an analog/digital converting circuit (A/D) 48 quantizes the output of the S/H circuit 46.

Thus, the video tape recorder 10 generates the phase control data DS2 by supplying the output signal of the analog/digital converting circuit 48 to the CPU 39, and the phase control data DS2 are then added to the phase control data DS1 and the velocity control data DF for driving the capstan motor 22.

In this manner, the RF maximum value detecting circuit is composed of the BPF 42, the envelope detecting circuit 44, the S/H 46, the A/D 48 and the CPU 39.

When the capstan motor is controlled by the CPU 39, a delay time provided by a delay circuit 50 is controlled on the basis of the time measurement result (i.e., equivalent to the counted value from the counter 40) for the second pilot signal SP2, thereby delaying the drum phase signal PG by a predetermined time to generating a sampling pulse PSH input to S/H circuit 46.

(4) Advantages of the Embodiment

According to the aforementioned arrangement by recording the first pilot signal which has large azimuth loss and the second pilot signal which has no azimuth loss near the central portion of the recording track, rough tracking control and fine tracking control can be executed on the basis of the second and first pilot signals respectively. Therefore, even when the amount of tracking deviation is large, tracking control can be executed easily and with high accuracy, and correspondingly even when the recording track is formed with high density, tracking control can be reliably carried out.

Also, since the first and second pilot signals are recorded with a one track cycle and a two track cycle respectively, tracking control can be reliably performed.

Further, since the first and the second pilot signals are recorded with interposition of a predetermined guard signal and a signal-free area, undesirable signal leakage can be avoided, thereby enabling reliable tracking control.

(5) Other Embodiments

Although in the aforementioned embodiment the first and the second pilot signals have been selected to have predetermined frequencies, the frequencies of the first and the second pilot signals need not be limited to those of the embodiment described above and can be set, to different values as required in accordance with the presence or absence of the azimuth loss.

Further, in the aforementioned embodiment there has been described a case wherein the first and the second pilot signals are recorded at substantially the central portion of the recording track. However, the present invention is not limited to this case, and the pilot signal can be recorded in a variety of positions on the recording track when sufficient recording accuracy is provided.

Further, according to the aforementioned embodiment, the first and the second pilot signals have been recorded with the audio signal recording area therebetween. However, the present invention is not limited to this case, and the first and the second pilot signals can be recorded in desired positions if the leakage during editing by insertion can be reliably prevented and further if there is no need of tracking on account of the editing.

Further in this case, it is also possible to change the recording positions of the first and the second pilot signals in each recording track.

Also, if the first and the second pilot signals can be reliably separated on reproduction by using BPF circuits, etc., the first and the second pilot signals can be recorded on the same area.

Moreover, in the aforementioned embodiment there has been described a case wherein the second pilot signal is recorded with interposition of the guard signal. However, this invention is not limited to such a case, and alternatively it is also possible to record the second pilot signal by interposing a signal-free area.

In addition, for this case, if there is no low frequency signal component (which lacks azimuth loss) recorded on the adjacent tracks, it is possible to eliminate the signal-free and guard signal areas.

Further, in the aforementioned embodiment, there has been described a case wherein the first and the second pilot signals are recorded with a one track cycle and a two track period cycle. However, the present invention is not limited to such a case, and the pilot signal recording cycle can be freely established in accordance with the disposition of the magnetic head etc. if the undesirable influence from the adjacent recording tracks etc. can be prevented.

Further, in the aforementioned embodiment, there has been described a case wherein the second pilot signal is recorded in a phase-matched state. However, the present invention is not limited to such a case, and may omit such phase matching so long as the waveform distortion is within a practically acceptable range.

Further, in the aforementioned embodiment, there has been described a case wherein burst signals at predetermined frequencies are selected as the first and second pilot signals. However, this invention is not limited to such a case, and a variety of signals can be selected as the first and the second pilot signals so long as the level of the first pilot signal and the timing of the second pilot signal respectively can be detected.

Furthermore, in the aforementioned embodiment there has been described a case wherein the digital video signal is recorded and reproduced using Class 4 Partial Response. However, the present invention is not limited to such a case and can be widely applied to cases in which the digital video signal is recorded and reproduced using a variety of recording methods and in which a digital signal other than the digital video signal is recorded.

While the preferred embodiments of the invention have been described, it will be obvious to those skilled in the art that various changes and modifications may be made therein and it is intended, therefore, to cover in the appended claims all such changes and modifications as fall within the true spirit and scope of the invention.

What is claimed is:

1. A magnetic recording and reproducing apparatus comprising:
   a rotary drum having a magnetic tape helically wrapped therearound;
   means for advancing the magnetic tape relative to said rotary drum;
   two magnetic heads mounted on said rotary drum and scanning said magnetic tape for recording a recording signal on the tape in successive inclined recording tracks as the tape is advanced, said magnetic heads having mutually different azimuth angles and forming respective ones of said inclined tracks;
   means for generating first and second pilot signals and for recording said first and second pilot signals with said recording signal in said inclined tracks by means of at least one of said magnetic heads, said first pilot signal having a higher frequency than said second pilot signal;
   means for reproducing said pilot signals from said inclined tracks by means of said magnetic heads, said first pilot signal having a frequency that is sufficiently high to result in substantial azimuth loss upon reproduction and said second pilot signal having a frequency that is sufficiently low to result in little azimuth loss upon reproduction; and
   tracking control means for performing rough tracking control on the basis of the reproduced second pilot signal and fine tracking control on the basis of the reproduced first pilot signal said tracking control means including means for detecting a level of said reproduced first pilot signal and for controlling said means for advancing the magnetic tape so as to maximize the detected level of the reproduced first pilot signal.

2. A magnetic recording and reproducing system according to claim 1, wherein said tracking control means also includes means for receiving said reproduced second pilot signal and a reference signal that represents a phase of rotation of said rotary drum, for measuring an interval between a time when said reference signal is received and a time when said reproduced second pilot signal is received, and for controlling said means for advancing the magnetic tape on the basis of said measured interval to perform said rough tracking control.

3. A magnetic recording and reproducing apparatus according to claim 1, wherein at least some of said inclined recording tracks have a first recording area and a second recording area formed at respective positions in a longitudinal direction of the recording tracks, said first pilot signal being recorded in said first recording area and said second pilot signal being recorded in said second recording area.

4. A magnetic recording and reproducing apparatus according to claim 3, wherein said first recording area is formed at substantially a center position in said longitudinal direction of the recording tracks, said second recording area is displaced by a predetermined distance from said first recording area towards a scanning start end of the recording track, and a predetermined recording signal is recorded in an area between said first and second recording areas.

5. A magnetic recording and reproducing apparatus according to claim 1, wherein said inclined recording tracks have first and second recording areas formed at respective positions in a longitudinal direction of the recording tracks, said first pilot signals being recorded in at least some of the first recording areas, and, with respect to a pair of said recording tracks consisting of a first recording track and a second track adjacent to said first recording track:
   said second pilot signal is recorded in the second recording area of the first recording track, and
   in the second recording area of the second recording track there is formed one of a signal-free area and a guard signal having a frequency that is sufficiently high to result in substantial azimuth loss upon reproduction.

6. A magnetic recording and reproducing apparatus according to claim 1, wherein at least some of said inclined recording tracks have a first recording area and second recording area formed at respective positions in a longitudinal direction of the recording tracks, said first pilot signal being recorded in said first recording area and said second pilot signal being recorded in said second recording area, the second pilot signal being recorded in the second recording area of a first of said recording tracks in a phase-matched state with a second pilot signal recorded in the second recording area of a second recording track that is adjacent to the first recording track.

7. A magnetic recording and reproducing apparatus according to claim 1, wherein:
   said rotary drum has mounted thereon a plurality of magnetic recording heads, each of which has a selected one of a positive azimuth angle and a negative azimuth angle;
   said inclined recording tracks are formed as successive pairs of tracks in a longitudinal direction of the magnetic tape, each said pair of tracks consisting of a track of a first type recorded with a positive azimuth angle and a track of a second type recorded with a negative azimuth angle; and
   said first pilot signals are recorded only in said first type of track.

8. A magnetic recording and reproducing apparatus according to claim 1, wherein:
   said rotary drum has mounted thereon a plurality of magnetic recording heads, each of which has a selected one of a positive azimuth angle and a negative azimuth angle;
   said inclined recording tracks are formed as successive pairs of tracks in a longitudinal direction of the magnetic tape, each said pair of tracks consisting of a track of a first type recorded with a positive azimuth angle and a track of a second type recorded with a negative azimuth angle; and
   said first pilot signals are recorded only in said second type of track.

9. A magnetic recording and reproducing apparatus according to claim 1, wherein:
   said rotary drum has mounted thereon a plurality of magnetic recording heads, each of which has a selected one of a positive azimuth angle and a negative azimuth angle;
   said inclined recording tracks are formed as successive pairs of tracks in a longitudinal direction of the magnetic tape, each pair of tracks consisting of a track of a first type recorded with a positive azimuth angle and a track of a second type recorded with a negative azimuth angle, said two tracks of each said pair of tracks being scanned substantially simultaneously by a corresponding pair of said magnetic heads;

said inclined recording tracks have first and second recording areas formed at respective positions in a longitudinal direction of the recording tracks, said first pilot signals being recorded in at least some of the first recording areas, said second pilot signals being recorded in at least some of said second recording areas; and said corresponding pair of said magnetic heads is arranged such that one head of said pair of heads scans the second recording area of a corresponding track of the pair of tracks at the same time the other head of said pair of heads scans the first recording area of the other track of the pair of tracks.

* * * * *